(12) United States Patent
Gagliardi, Jr.

(10) Patent No.: US 7,479,296 B2
(45) Date of Patent: Jan. 20, 2009

(54) METHOD OF CUTTING MEAT TO FORM STEAK CUTS AND MEAT PRODUCTS FORMED BY THE METHOD

(75) Inventor: Eugene D. Gagliardi, Jr., Atglen, PA (US)

(73) Assignee: Skippack Creek Corporation, Wilmington, DE (US)

( * ) Notice: Subject to any disclaimer, the term of this patent is extended or adjusted under 35 U.S.C. 154(b) by 916 days.

(21) Appl. No.: 11/035,631

(22) Filed: Jan. 14, 2005

(65) Prior Publication Data

US 2005/0170055 A1    Aug. 4, 2005

Related U.S. Application Data

(60) Provisional application No. 60/568,114, filed on May 4, 2004, provisional application No. 60/540,145, filed on Jan. 29, 2004.

(51) Int. Cl.
*A23L 1/31* (2006.01)
(52) U.S. Cl. .......................... 426/641; 426/513
(58) Field of Classification Search ................ 426/641, 426/513
See application file for complete search history.

(56) References Cited

U.S. PATENT DOCUMENTS

| | | | | |
|---|---|---|---|---|
| 4,072,763 A | * | 2/1978 | Mart | 426/513 |
| 4,258,068 A | * | 3/1981 | Huffman | 426/272 |
| 4,377,597 A | * | 3/1983 | Shapiro et al. | 426/92 |
| 4,539,210 A | * | 9/1985 | O'Connell et al. | 426/56 |
| 4,728,524 A | * | 3/1988 | Gagliardi, Jr. | 426/272 |
| 4,874,623 A | * | 10/1989 | Matthews et al. | 426/272 |
| 5,932,278 A | * | 8/1999 | Gagliardi, Jr. | 426/644 |
| 5,951,392 A | * | 9/1999 | Gagliardi | 452/125 |

* cited by examiner

*Primary Examiner*—Arthur L Corbin
(74) *Attorney, Agent, or Firm*—Panitch Schwarze Belisario & Nadel LLP

(57) ABSTRACT

A method of cutting a piece of meat which is initially generally in the shape of a parallelepiped to produce at least one steak portion includes cutting the meat along four generally curved first cut lines extending generally parallel to the grain of the meat to remove four corners of the meat and create a meat portion which is cylindrically shaped. The cylindrically shaped meat portion is cut along each of a plurality of parallel second cut lines each generally perpendicular to the grain of the meat and spaced from each other by a first predetermined distance to create a plurality of disk-like generally cylindrical meat portions each having a thickness corresponding to the first predetermined distance and each having a diameter corresponding to the diameter of the cylindrically shaped meat portion. At least one of the disk-like meat portions is cut along each of a plurality of third cut lines, each of the third cut lines extending radially inwardly from an outer circumferential edge of the disk-like meat portion toward but not entirely through the axial center of the disk-like meat portion to create an uncut center portion, the third cut lines being circumferentially spaced apart by a second predetermined distance to produce a steak portion having a plurality of generally truncated pie wedge shaped portions held together by the center portion.

12 Claims, 2 Drawing Sheets

METHOD OF CUTTING MEAT TO FORM STEAK CUTS AND MEAT PRODUCTS FORMED BY THE METHOD

CROSS REFERENCE TO RELATED APPLICATIONS

This application claims the benefits of U.S. Provisional Patent Applications Nos. 60/540,145 filed Jan. 29, 2004 and 60/568,114 filed May 4, 2004, both entitled "Method of Cutting Meat to Form Steak Wedges and Meat Product Formed by the Method", the subject matter of which is hereby incorporated herein by reference.

BACKGROUND OF THE INVENTION

The present invention relates generally to a method for cutting a piece of meat in a manner which results in steak cuts and the steak cuts resulting from employing the disclosed method.

The present invention, while described below in terms of a particular cut of beef, has equal applicability to other forms of meat including pork, lamb, veal and also birds such as chicken, turkey, duck, etc., particularly the breast cut. The present invention is adapted to add significant value to meat by taking what would ordinarily be a relatively tough, lower value cut of meat and turning it into a higher value cut of meat which is tenderer and is particularly well suited to grilling, pan frying or the like. A cut of meat prepared in accordance with the method of the present invention is generally disk-like, cylindrical and has a thickness which may vary depending upon the desires of the consumer. In the presently preferred embodiment, the cut of meat comprises a cylinder having a diameter preferably in the range of 3 to 6 inches and having a thickness preferably in the range of about ⅛ inch to about 2½ inches. The cylindrical cut of meat includes generally radially extending cuts made through at least a portion thereof to establish a steak cut including a plurality of generally truncated pie-wedge shaped portions held together at the center which can be conveniently separated after cooking for consumption or for further cutting, if desired.

SUMMARY OF THE INVENTION

Briefly stated, the present invention comprises a method of cutting a piece of meat which is initially generally in the shape of a parallelepiped to produce at least one steak portion. The method includes the steps of: cutting the meat along four generally curved first cut lines extending generally parallel to the grain of the meat to remove four corners of the meat and to thereby create a meat portion which is generally cylindrically shaped and elongated; cutting the generally cylindrically shaped meat portion along each of a plurality of generally parallel second cut lines, each of the second cut lines being generally perpendicular to the grain of the meat and being spaced from each other by a first predetermined distance to create a plurality of disk-like cylindrical meat portions each having a predetermined thickness corresponding to the first predetermined distance and each having a predetermined diameter corresponding to the diameter of the cylindrically shaped meat portion; and cutting at least one of the disk-like meat portions along each of a plurality of third cut lines, each of the third cut lines extending generally radially inwardly from a curved outer circumferential edge of the at least one disk-like meat portion toward but not entirely through the axial center of the at least one disk-like meat portion to create an uncut center portion, the third cut lines being circumferentially spaced apart by a second predetermined distance to produce a steak portion having a plurality of generally truncated pie wedge shaped portions held together by the center portion.

BRIEF DESCRIPTION OF THE SEVERAL VIEWS OF THE DRAWINGS

The foregoing summary as well as the following detailed description of the invention will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings.

DETAILED DESCRIPTION OF THE INVENTION

Figure 5:
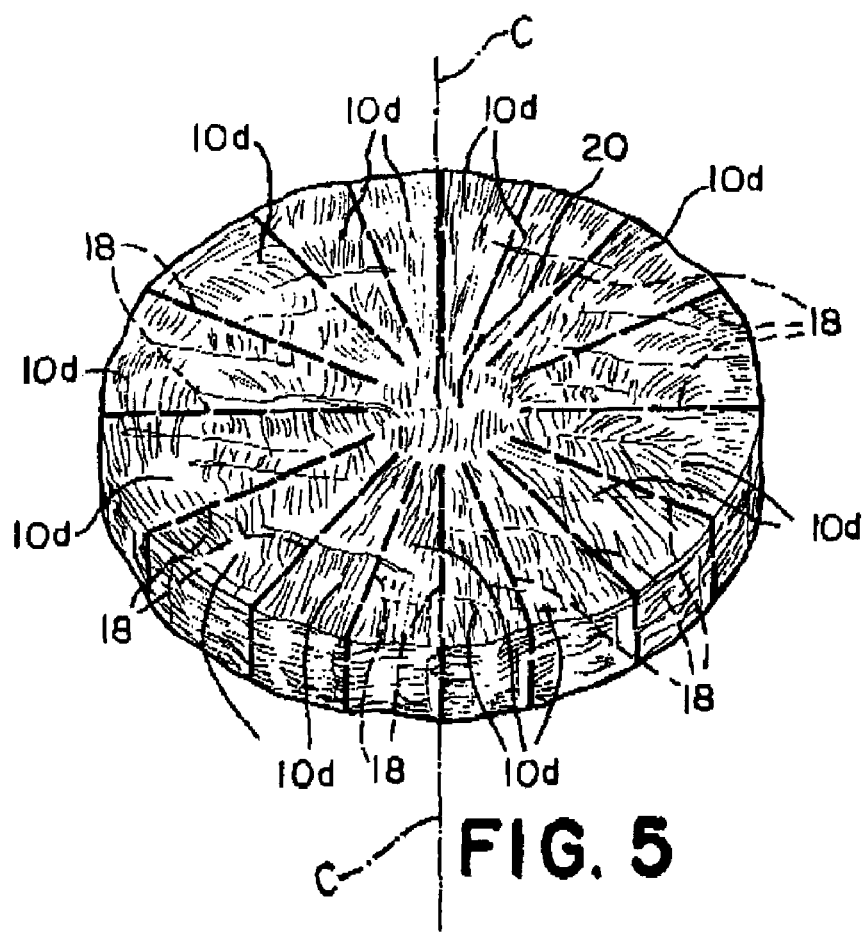
FIG. 5 is a perspective view of the generally disk-like cylindrical portion of beef shown in FIG. 4 which has been cut along a plurality of generally radially extending third cut lines.

The present invention comprises a method of cutting meat, such as a primal cut of meat, in a manner so that the resulting steak cut can be grilled, pan fried or otherwise quickly cooked. More particularly, and as illustrated in FIG. 5, the meat cut which results from employing the method of the present invention results in a generally disk-like cylindrical steak portion 10c which is generally sized for consumption by one or two persons and in which the meat has been pre-cut into generally truncated pie-wedge shaped pieces 10d which are either bite sized or near bite sized to facilitate convenient, quick cooking and consumption. In the present embodiment, the steak cut 10c made in accordance with the present invention comes from a large piece of meat which contains primarily muscle with little or no fat. A top round of beef 10 is used to illustrate the present method. It should be clearly understood that the present method is equally applicable to other cuts of beef, particularly primal cuts, such as a bottom round, clod heart, sirloin tip, etc. or to other or similar primal or high muscle content cuts of meat from other animals such as pork, lamb, veal, etc. Further, the present invention is applicable with respect to high muscle content bird meat, particularly a breast of chicken, duck, turkey, etc. Typically, a top round of beef 10 and other such primal cuts which contain mostly muscle and little fat are usually tough and, therefore, are typically prepared for consumption in limited ways, including slow cooking, braising, or the like. The present invention permits meat from such high muscle, low fat cuts, such as a top round of beef 10, to be prepared in a manner in which the resulting meat product is much more suitable for cooking in other, quicker manners, typically grilling, pan frying, or the like.

Figure 1:
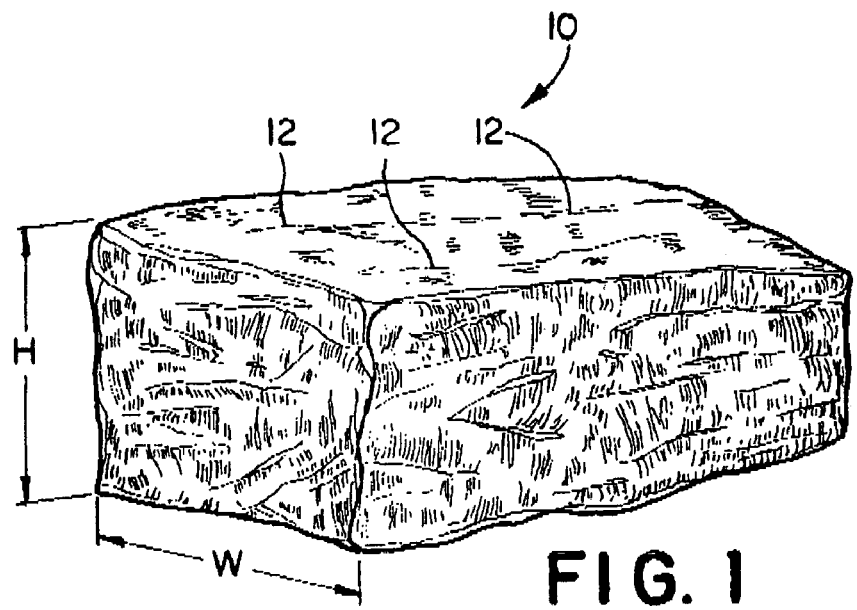
FIG. 1 is a perspective view of a typical top round of beef which will be used for illustrating the method of the present invention.

FIG. 1 is a perspective view of a typical top round of beef 10 which as discussed above is utilized only for illustrating the method of the present invention. It should be clearly understood that the method of the present invention is equally applicable to any other primal cut of beef such as a bottom round, or, as mentioned above, a muscle of any other animal. As shown in FIG. 1, the top round of beef 10, which is generally in the shape of a parallelepiped, has a height H, a width W and a length or thickness extending with the grain of the meat, illustrated by grain lines 12, from end to end.

Figure 2:
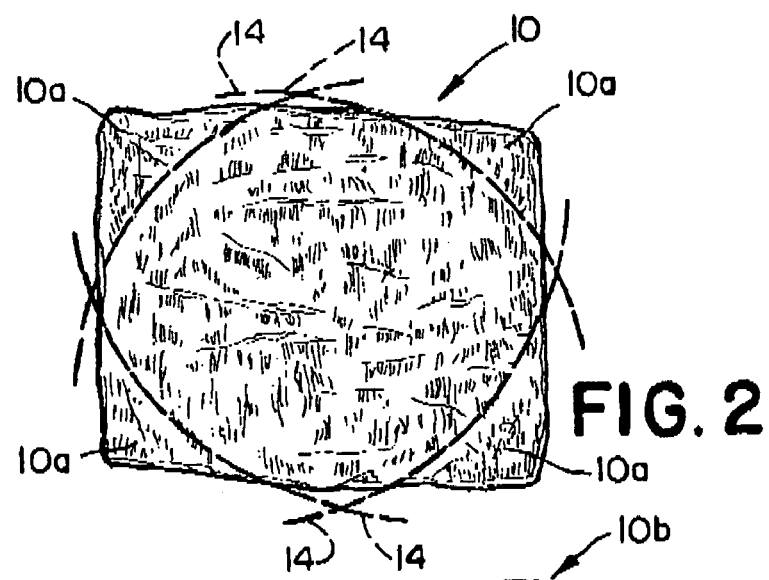
FIG. 2 is an end view of the top round of beef shown in FIG. 1 annotated with a plurality of generally curved first cut lines in accordance with a preferred embodiment of the method of the present invention.
Figure 3:
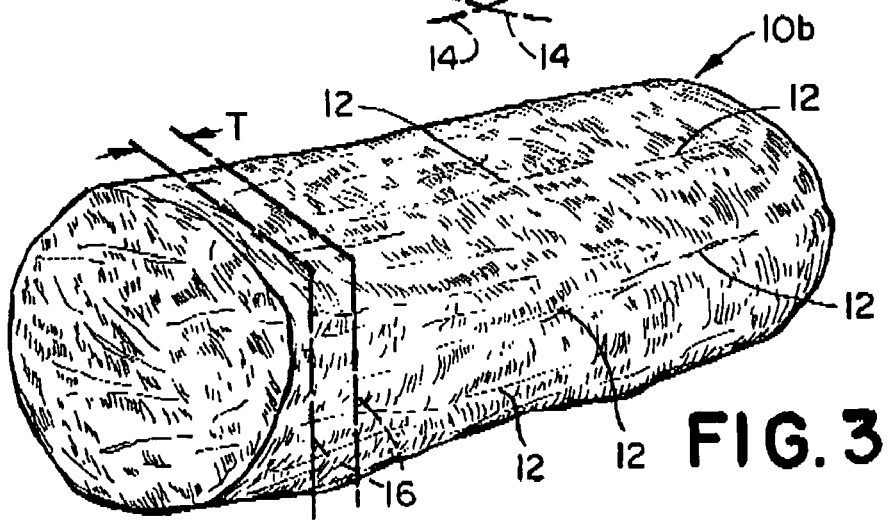
FIG. 3 is a perspective view of the top round of beef shown in FIG. 1 after cuts have been made along the first cut lines shown in FIG. 2 and annotated with second cut lines in accordance with a preferred embodiment of the present method.

FIG. 2 is an end view of the beef round 10 of FIG. 1 with the addition of several generally curved first cut lines 14. The first cut lines 14 extend across the height H and width W of the beef round 10 and along the length or thickness essentially with or parallel to the grain of the meat as illustrated by grain lines 12. The first cut lines 14 are preferably at least slightly curved and extend generally parallel to the grain lines 12 proximate to the four corners 10a of the top round 10. The first step involved in the present invention is to cut the top round of beef 10 with the grain of the meat along each of the four first cut lines 14 from one end to the other end thereby resulting in the removal of each of the four corners 10a of the beef round 10 to create a top round portion 10b which is generally round or oblong in cross section or end view and is generally elongated and cylindrically shaped as shown in FIG. 3. The nominal diameter of the cylindrically shaped top round portion 10b generally corresponds to the initial height H of the top round of beef 10 shown in FIG. 1. Typically, the height H of a top round of beef is in the range of about 3 inches to about 6 inches so that the diameter of the cylindrical top round portion 10b would also preferably be in the range of 3 to 6 inches. The location and curvature of the first cut lines 14 may be adjusted to provide the generally cylindrical shape to the top round portion 10b. It will be apparent to those of ordinary skill in the art that the dimensions of the top round 10 will vary from animal to animal and that the diameter of the cylindrical top round portion 10b will also vary from animal to animal. Further, the overall length or thickness (distance from end to end) of the top round portion 10b will vary from animal to animal.

In the preferred embodiment of the present method, the next step is to subject the cylindrical top round portion 10b to a tenderizing process, such as needle tenderizing, in a manner well known to those of ordinary skill in the art. Alternatively, the tenderizing step could be applied to the entire top round 10 before the first cutting step or after one or more of the below-described steps of the present method. Needle tenderizing is a technique well known to those of ordinary skill in the art and is utilized to tenderize a tougher cut of meat. If desired, other forms of tenderizing could alternatively be employed.

In forming the cylindrical top round portion 10b, the beef round 10 is cut along each of the first cut lines 14 shown in FIG. 2 to remove the corner portions 10a utilizing a standard butcher knife (not shown), meat saw (not shown), water knife (not shown) or any other cutting device or apparatus well known to those of ordinary skill in the meat art. Such devices and apparatus may also be employed in performing the below-described cutting steps. It will be appreciated by those of ordinary skill in the art that the present invention is not limited to a particular device or apparatus used for making the cuts through the meat as described above and/or as described below.

Referring to FIG. 3, in a first preferred embodiment, the next step of the present method involves cutting the generally cylindrical beef round portion 10b along each of a plurality of generally parallel spaced apart second cut lines 16, only two of which are illustrated in FIG. 3. Preferably, the distance from the first end of the cylindrical top round portion 10b to the first of the second cut lines 16 as well as the distance T between the second cut lines 16 is a first predetermined distance, preferably in the range of about ⅛ inch to about 2½ inches depending upon the desired thickness of the final steak products. It will be appreciated by those of ordinary skill in the art that the first predetermined distance or thickness T could vary if desired. As shown in FIG. 3, each of the second cut lines 16 is generally across or perpendicular to the grain of the cylindrical top round portion 10b as illustrated by grain lines 12.

Figure 4:
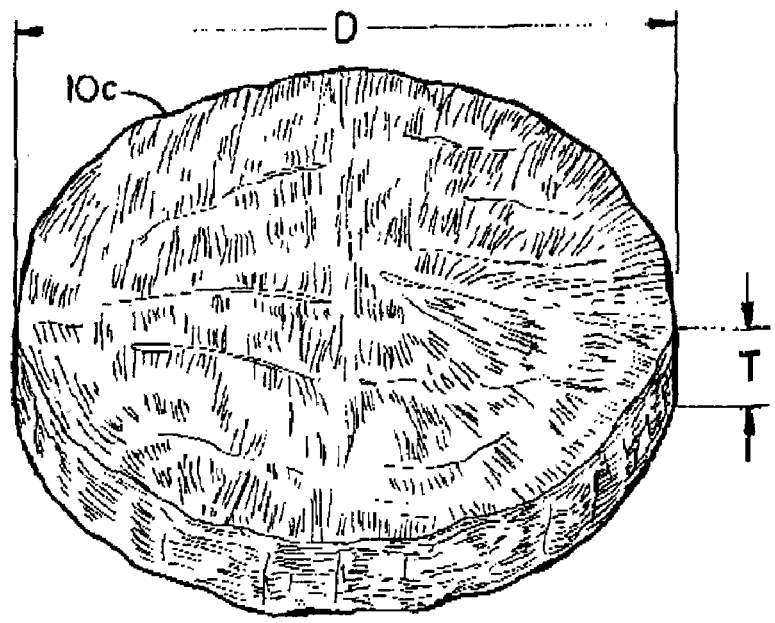
FIG. 4 is a top perspective view of a generally disk-like cylindrical portion of beef formed by cutting the top round of beef shown in FIG. 3 along the second cut lines.

FIG. 4 illustrates a single generally disk-like, cylindrical top round steak portion 10c which is one of a plurality of disk-like cylindrical portions 10c which results from making the cuts along the second cut lines 16 through the cylindrical top round portion 10b across the grain of the meat as shown in FIG. 3. The resulting top round steak portion 10c is generally disk-like and cylindrical with a diameter D generally corresponding to the height H of the original top round cut 10 and with a thickness T which will vary depending upon the taste of the consumer but preferably will be in the range of between ⅛ inch and 2½ inches. Depending upon the diameter D and the thickness T, the resulting generally disk-like top round steak portion 10c is suitable for consumption by one or two persons. It should be understood that a plurality of such disk-like steak portions 10c may be created from a single cylindrical beef round portion 10b and that the thickness T may be varied if desired. If the tenderizing step has not previously been applied, the generally disk-like top round steak portion 10c may be subjected to the tenderizing step as described above. If desired, the disk-like steak portion 10c may be cooked and consumed without being further cut as described below.

The final step of the first embodiment of the present method is to cut the disk-like top round steak portion 10c along each of a plurality of generally radially extending third cut lines 18 which are circumferentially spaced from each other by a second predetermined distance as shown in FIG. 5. Note that the radially extending cut lines 18 extend inwardly from the peripheral or outer circumferential edge of the generally cylindrical top round steak portion 10c toward but not entirely through the axial center C. Instead, each of the cut lines 18 falls short of the axial center C by a third predetermined distance which, in the present embodiment is approximately about ⅛ inch to about 1 inch to establish an uncut center portion 20. As best shown in FIG. 5, the third cuts extend completely through the generally disk-like top round steak portion 10c from top to bottom to establish a plurality of meat pieces or portions 10d which are each generally in the shape of a truncated pie wedge. The radial dimension of each pie wedge-shaped piece 10d depends upon the number of third cut lines 18 which are employed and the spacing between the third cut lines 18. In the embodiment illustrated in FIG. 5, sixteen generally equally circumferentially spaced third cut lines 18 which are each spaced apart by about twenty two and one half degrees, are present to establish sixteen generally wedge-shaped pieces 10d. However, it will be apparent to those of ordinary skill in the art that a lesser or greater number of third cuts could alternatively be made and that the third cuts need not be equally spaced apart. The number and spacing of the third cut lines 18 is preferably established so that the pie wedge shaped pieces 10d are very thin, for example about ⅛ inch thick where each wedge shaped piece 10d joins the uncut center portion 20. As can be seen from FIG. 5, the uncut center portion 20 maintains the various truncated pie wedge-shaped pieces 10d together as an integral generally disk-like steak portion 10c at least during the cooking process.

The third cuts made through the generally disk-like cylindrical top round steak portion 10c may be made utilizing any known technique. If desired, a special tool may be formed which makes all of the third cuts in a single step. A related tool is disclosed in U.S. Pat. No. 5,771,771, entitled "Apparatus for Cutting a Sausage Product" and U.S. Pat. No. 6,248,013, entitled "Apparatus for Processing Meat," the subject matter of each of which are hereby incorporated herein by reference. Other tools will be apparent to those of ordinary skill in the art. Alternatively, each such third cut may be made utilizing standard cutting tools or apparatus such as a knife, water knife, saw, etc. It should be clearly understood that the present method is not limited to a particular device or apparatus employed for making the third cuts.

A second preferred embodiment of the present invention involves changing the order in which the above-described method steps are employed. In the second preferred embodiment, once the generally cylindrical top round portion 10b of FIG. 3 has been established, the cylindrical top round portion 10b is cut along the third cut lines 18 as shown in FIG. 5. The needle tenderizing step may be applied before or after the third cuts are made. Once the third cuts are made from end to end of the elongated cylindrical top round portion 10b, a set of second cuts are made along cut lines 16 to establish the disk-like generally cylindrical steak portions 10c as shown in FIG. 5.

As mentioned above, the resulting steak portion 10c as shown in FIG. 5 is suitable for grilling, pan frying, or may be prepared in some other manner. If the steak portion 10c is to be grilled, it is preferably grilled in a manner similar to that of a sirloin steak by first grilling it on one side for a desired time period and then turning it over and grilling it on the other side for a desired time period. Once the top round steak portion 10c is turned over for grilling on the second side, a pat of butter or spoonful of a sauce, such as barbeque sauce may be applied to the uncut center portion 20. As the grilling of the second side continues, the butter or sauce melts and flows radially outwardly and into the third cuts to further tenderize and add flavor to the meat.

Once the top round steak portion 10c has been completely cooked to the desired amount of doneness, the top round steak portion 10c is removed from the grill for consumption. Consumption involves cutting through the uncut center portion 20 to establish a plurality of individual generally wedge-shaped steak pieces 10d. Depending upon the diameter D and the thickness T of the top round portion 10c, the wedge-shaped pieces 10d may be bite sized or may be cut into two or more smaller pieces for consumption. Again, depending upon the diameter D and thickness T each top round steak portion 10c may be sufficient for a single serving or may provide two or more servings. If desired, the top round steak portion 10c may be marinated prior to cooking or may be subjected to other preparation techniques such as dry rubbing, etc. As an alternative, the steak portion 10c may be placed on a bun or roll to make a steak sandwich.

From the foregoing, it can be seen that the present invention comprises a method of cutting a lower value, high muscle piece of meat to establish a unique, high value steak cut which is suitable for grilling or other quick cooking techniques. It will be appreciated by those skilled in the art that changes could be made to the embodiments described above without departing from the broad inventive concept thereof. It is understood, therefore, that this invention is not limited to the particular embodiments disclosed, but it intended to cover all modifications within the sprit and scope of the present invention.

I claim:

1. A method of cutting a piece of meat which is initially generally in the shape of a parallelepiped to produce at least one steak portion, the method comprising the steps of:
    cutting the meat along four generally curved first cut lines extending generally parallel to the grain of the meat to remove four corners of meat and to thereby create a meat portion which is generally cylindrically shaped and elongated;
    cutting the generally cylindrically shaped meat portion along each of a plurality of generally parallel second cut lines, each of the second cut lines being generally perpendicular to the grain of the meat and being spaced from each other by a first predetermined distance to create a plurality of disk-like cylindrical meat portions each having a predetermined thickness corresponding to the first predetermined distance and each having a predetermined diameter corresponding to the diameter of the cylindrically shaped meat portion; and
    cutting at least one of the disk-like meat portions along each of a plurality of third cut lines, each of the third cut lines extending generally radially inwardly from a curved outer circumferential edge of the at least one disk-like meat portion toward but not entirely through the axial center of the at least one disk-like meat portion to create an uncut center portion, the third cut lines being circumferentially spaced apart by a second predetermined distance to produce a steak portion having a plurality of generally truncated pie wedge shaped portions held together by the center portion.

2. The method as recited in claim 1 wherein the first predetermined distance is in the range of ⅛ inch to 2½ inches.

3. The method as recited in claim 1 wherein all of the second cut lines are spaced apart by the same first predetermined distance.

4. The method as recited in claim 1 wherein the third cut lines are spaced apart by the same second predetermined distance.

5. The method as recited in claim 1 wherein the second predetermined distance is about 22½ degrees.

6. The method as recited in claim 1 further including the step of tenderizing the meat.

7. The method as recited in claim 6 wherein the tenderizing step comprises needle tenderizing.

8. The method as recited in claim 1 wherein the uncut center portion has a diameter in the range of about ¼ to one inch.

9. The method as recited in claim 1 wherein the piece of meat is a primal cut of meat.

10. The method as recited in claim 9 wherein the primal cut of meat is one of a top round, a bottom round, a clod heart, a sirloin tip and another high muscle content cut.

11. The method as recited in claim 9 wherein the meat is one of beef, pork, veal and bird.

12. The method as recited in claim 1 wherein the piece of meat is a top round of beef.

* * * * *